United States Patent [19]

Lezotte et al.

[11] Patent Number: 4,958,877
[45] Date of Patent: Sep. 25, 1990

[54] COMPOSITE PIVOT BUSHING AND COVER FOR VEHICLE SEAT HINGE BRACKET

[75] Inventors: James P. Lezotte, Redford; Wilbur E. Schwartz, Jr., Dearborn Heights, both of Mich.

[73] Assignee: Chrysler Corporation, Highland Park, Mich.

[21] Appl. No.: 387,912

[22] Filed: Aug. 1, 1989

[51] Int. Cl.⁵ ............................................... B60N 1/02
[52] U.S. Cl. .................................. 296/65.1; 297/378; 16/250; 16/DIG. 13
[58] Field of Search ................. 296/65.1, 69; 297/378; 16/225, 250, 251, DIG. 13

[56] References Cited

U.S. PATENT DOCUMENTS

| | | | |
|---|---|---|---|
| 2,585,836 | 2/1952 | Quigley | 16/250 |
| 4,191,417 | 3/1980 | Ferrara | 296/65.1 |
| 4,286,819 | 9/1981 | Inoue et al. | 296/65.1 |
| 4,570,291 | 2/1986 | Smith et al. | 16/250 |
| 4,572,569 | 2/1986 | Habmann | 296/65.1 |
| 4,699,426 | 10/1987 | Tagawa | 297/378 |
| 4,708,385 | 11/1987 | Kondo | 296/65.1 |
| 4,805,953 | 2/1989 | Yamauchi | 296/65.1 |
| 4,881,767 | 11/1989 | Kondo | 296/65.1 X |

FOREIGN PATENT DOCUMENTS 244633  12/1985  Japan ..................................... 296/69

Primary Examiner—Johnny D. Cherry
Assistant Examiner—Joseph D. Pape
Attorney, Agent, or Firm—Edward P. Barthel

[57] ABSTRACT

A composite pivot bushing and cover device for a vehicle seat center hinge bracket disposed between side-by-side fold down seat backs. The composite cover is a molded one-piece plastic housing having a top wall, forward and aft end wall extensions, and a side wall oppositely disposed from a matching side closure, defining a chamber with an open-ended bottom adapted to enclose the hinge bracket. The side closure is integrally joined to the aft end wall along its axis of rotation defined by a living hinge. A pivot bushing perpendicularly projects from the inner surface of the side closure and, upon the closure being rotated to its closed position and locked in a snap-action manner, the bushing is captured in a hinge bracket bore aligning it on the seat back pivot axis.

4 Claims, 4 Drawing Sheets

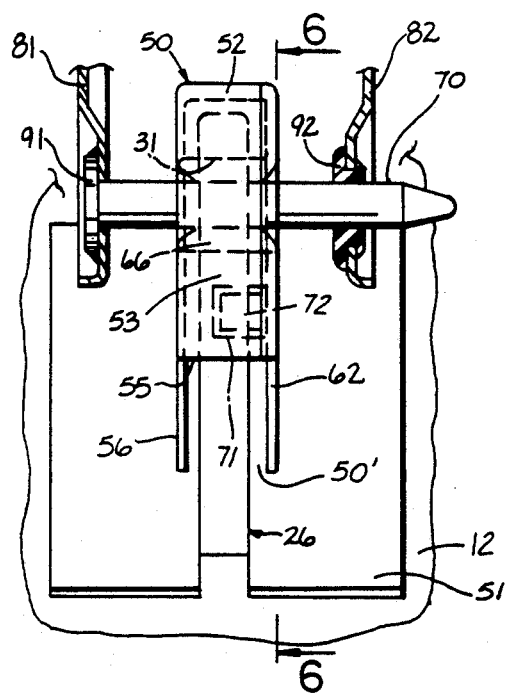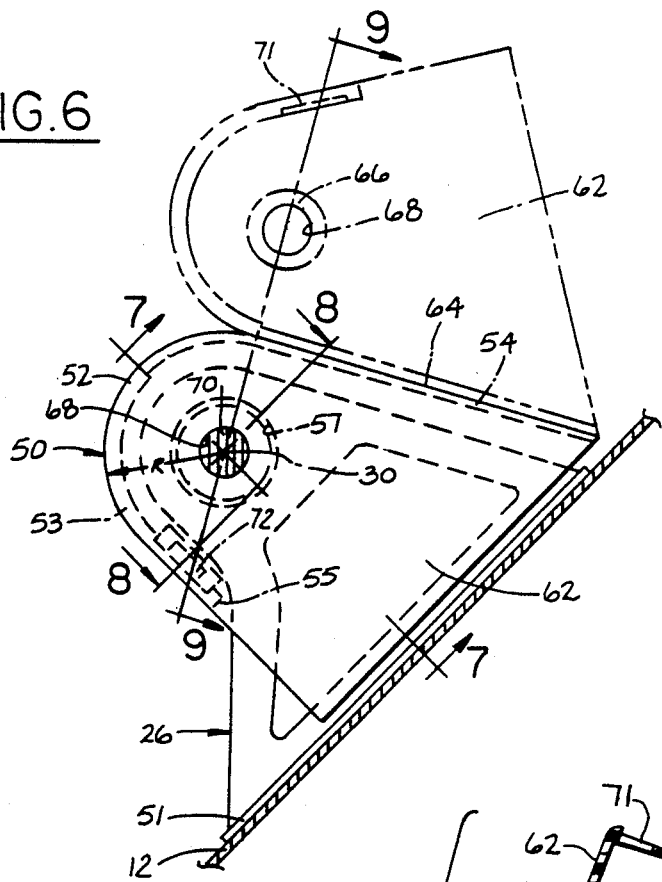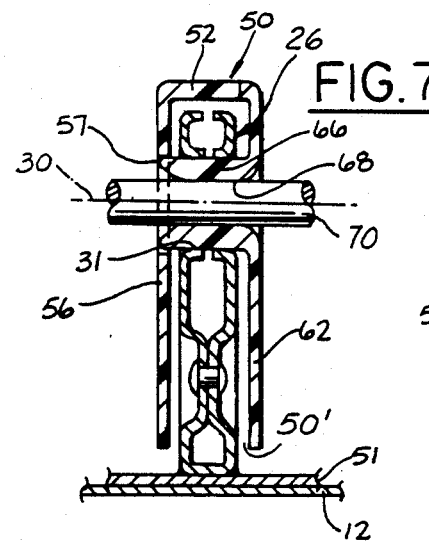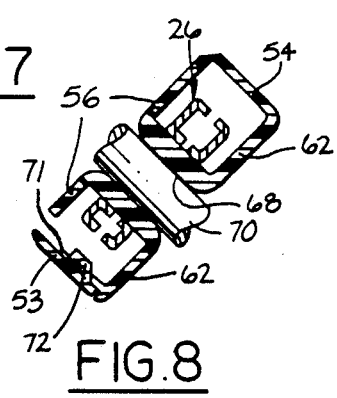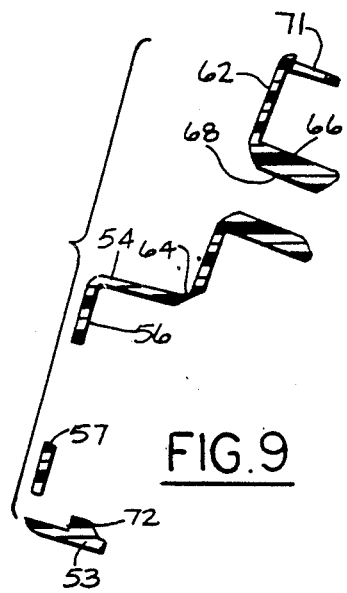

4,958,877

COMPOSITE PIVOT BUSHING AND COVER FOR VEHICLE SEAT HINGE BRACKET

BACKGROUND OF THE INVENTION

This invention relates generally to automobile seat assemblies and, more particularly, to a composite pivot bushing and cover device for a rear seat hinge bracket.

An example of prior art vehicle seat bracket covers is shown in U.S. Pat. No. 4,699,426 issued Oct. 13, 1987 to Tagawa. The Tagawa patent discloses a vehicle seat whose seat back can be collapsed forward in relation to the seat cushion and wherein the projected upper end of a bracket located on the side of the seat cushion is covered by a hinge cover. The hinge cover is made of synthetic resin and separates the projected end of a bolt from the side of the seat back protecting its surface cover material from damage.

In a particular prior art arrangement depicted in FIG. 1 a vehicle body is partially shown at 10 providing a passenger compartment including a floor 12 and sides 13 supporting a rear seat assembly 14'. The seat assembly includes a seat cushion 15 and a pair of fold-down rear backrests or seat backs, i.e. a right-hand seat back 16' and a left-hand seat back 18'. The seat backs have a common center hinge assembly, shown at 17' in prior art FIG. 1A, intervening between the two seat backs adapted to engage a pair of inboard seat back bushings mounted to the seat back frames such as the seat back inboard bushings 19', shown in FIG. 1. The seat backs 16' and 18' are illustrated in their un-assembled fold-down mode with the right-hand seat back 16' adapted for pivotal attachment to its associated right-hand outboard body wall mount 20. A corresponding left-hand outboard body wall mount is shown at 21 having an aperture 23 aligned on the seat back pivot axis.

The center hinge assembly 17' of prior art FIG. 1A includes a hinge bracket 24', a pivot pin sub-assembly 26', a hinge bracket cover 28', and a locking nut 29'. FIG. 1A shows, in exploded form, the pivot pin sub-assembly 26' aligned on seat back pivot axis 30' which passes through the center of hinge bracket bore 31'. The bore 31' is adapted to support the pivot pin sub-assembly 26' by means of its threaded sleeve 32' passing through the bore 31' such that sleeve annular raised bearing shoulder 33' is snugly positioned in the bore 31'. The threaded sleeve 32', formed with a hex head 34' and a stop collar 35', is concentrically fixed on a double-ended pivot pin 36'. Upon the nut 29' being engaged on the threaded sleeve 32' the pivot pin 36' is aligned on the hinge axis 30.

The sock-like cover 28', made of flexible material having a closed upper end 38' and an oppositely disposed open lower end, is sized and configured to substantially cover the hinge bracket 24' concealing it from view. The hinge bracket cover 28' has a pair of aligned apertures, the left-hand aperture being indicated at 40', adapted for receiving therethrough an associated end of the double-ended pivot pin 36'. The cover 28' is formed with a slit 42' running substantially the full length of the forward end wall to the cover open lower end constructed to allow the cover 28' to be fitted over the upper end of the hinge bracket 24' and substantially enclosing it from view. The total prior art assembly 17' consists of three parts which require installation during an automotive assembly line operation together with two difficult blind hole operations on the assembly line. It will be noted that a prior art angle brackets 44' are adapted to be secured by bolts 46' to associated outboard corners of the seat backs 16' and 18'. A hinge pins 48' is supported by each angle bracket 20 and 21 and is adapted to pass through bushings 49' for reception in their respective wall mount openings 22.

SUMMARY OF THE INVENTION

It is an object of the present invention to provide a composite pivot bushing and cover device for a hinge bracket which is substantially easier, faster, and more economical to install than previously known devices.

It is another object of the present invention to provide a composite pivot bushing and cover device for a hinge bracket which substantially reduces the number of parts required and production processes that must be performed before and during the assembly of a motor vehicle, especially on a mass production basis.

The present invention provides a composite center pivot bushing and cover assembly wherein the cover is a one-piece molded plastic housing having a top wall, forward and aft end wall extensions, and a side wall oppositely disposed from a matching side closure. The housing thus defines a chamber with an open-ended bottom adapted to conceal an upstanding floor mounted hinge bracket interposed between a pair of side-by side fold-down seat backs. The side closure is integrally joined to one end wall extension along its axis of rotation by a living hinge. A sleeve-like pivot bushing perpendicularly projects from the inner surface of the side closure together with a latch keeper adapted to engage, in a snap-action manner, a latch member integral with one end wall extension. With the housing walls positioned about the hinge bracket the side closure may be rotated to its latched mode the pivot bushing is captured in its hinge bracket bore in alignment with the pivot axis for ready reception of a seat back pivot hinge pin.

BRIEF DESCRIPTION OF THE DRAWINGS

The present invention will be better understood by reference to the following detailed description of a preferred embodiment when read in conjunction with the accompanying drawings in which like reference characters refer to like parts throughout the view and in which:

FIG. 5 is an enlarged fragmentary vertical cross sectional view, partly in elevation, of the composite center pivot bushing and cover installed on the center hinge bracket;

FIG. 6 is a vertical sectional view partly in elevation showing the composite center pivot bushing showing the left hand side wall of the cover in phantom in its unlatched folded open mode;

FIG. 7 is a fragmentary cross sectional view, partly in elevation, taken on line 7—7 of FIG. 6;

FIG. 8 is a fragmentary cross sectional view taken on the line 8—8 of FIG. 6; and FIG. 9 is a fragmentary cross sectional view taken substantially on the line 9—9 of FIG. 6.

DETAILED DESCRIPTION OF THE INVENTION

Figure 2:
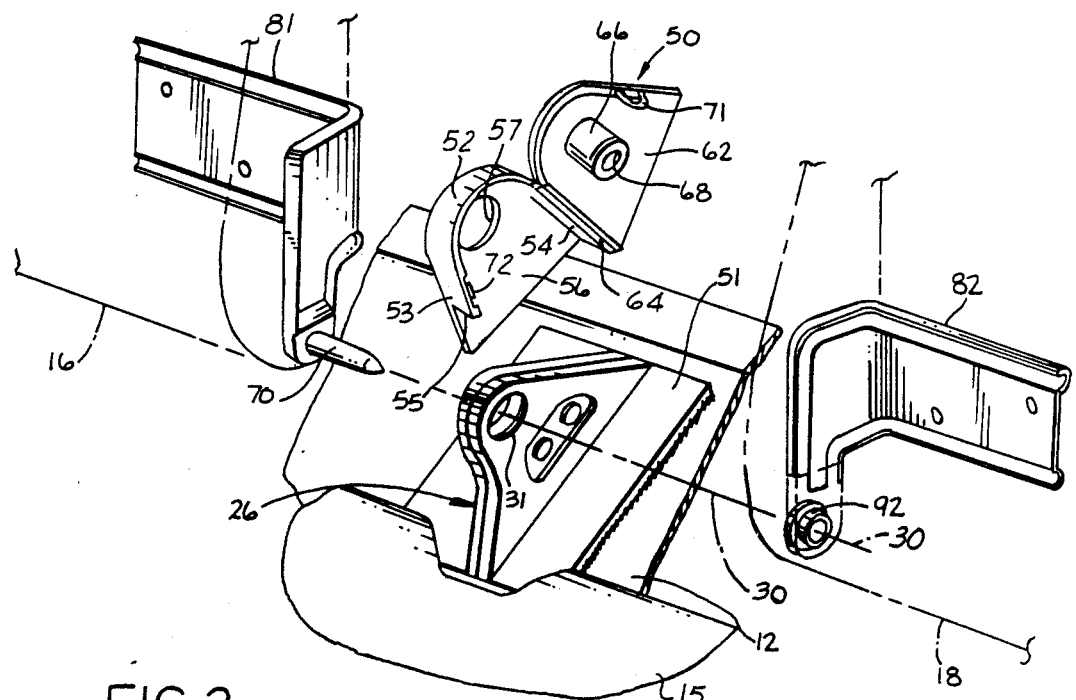
FIG. 2 is a fragmentary exploded perspective view of the seat back rests of FIG. 1 showing a composite center pivot bushing and cover arrangement for the center hinge bracket of FIG. 1.
Figure 3:
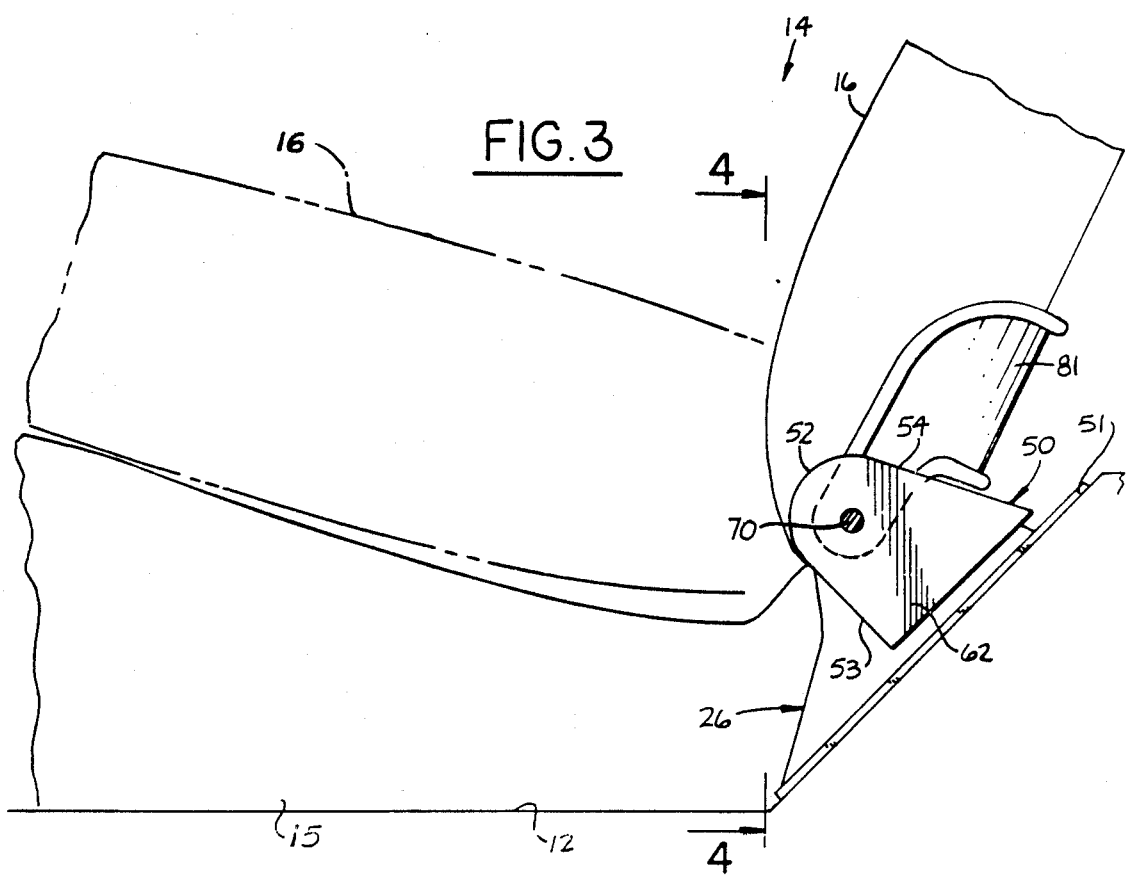
FIG. 3 is an enlarged fragmentary side elevational view of the right hand seat back rest assembled with the composite center pivot bushing and cover arrangement of FIG. 2.
Figure 4:
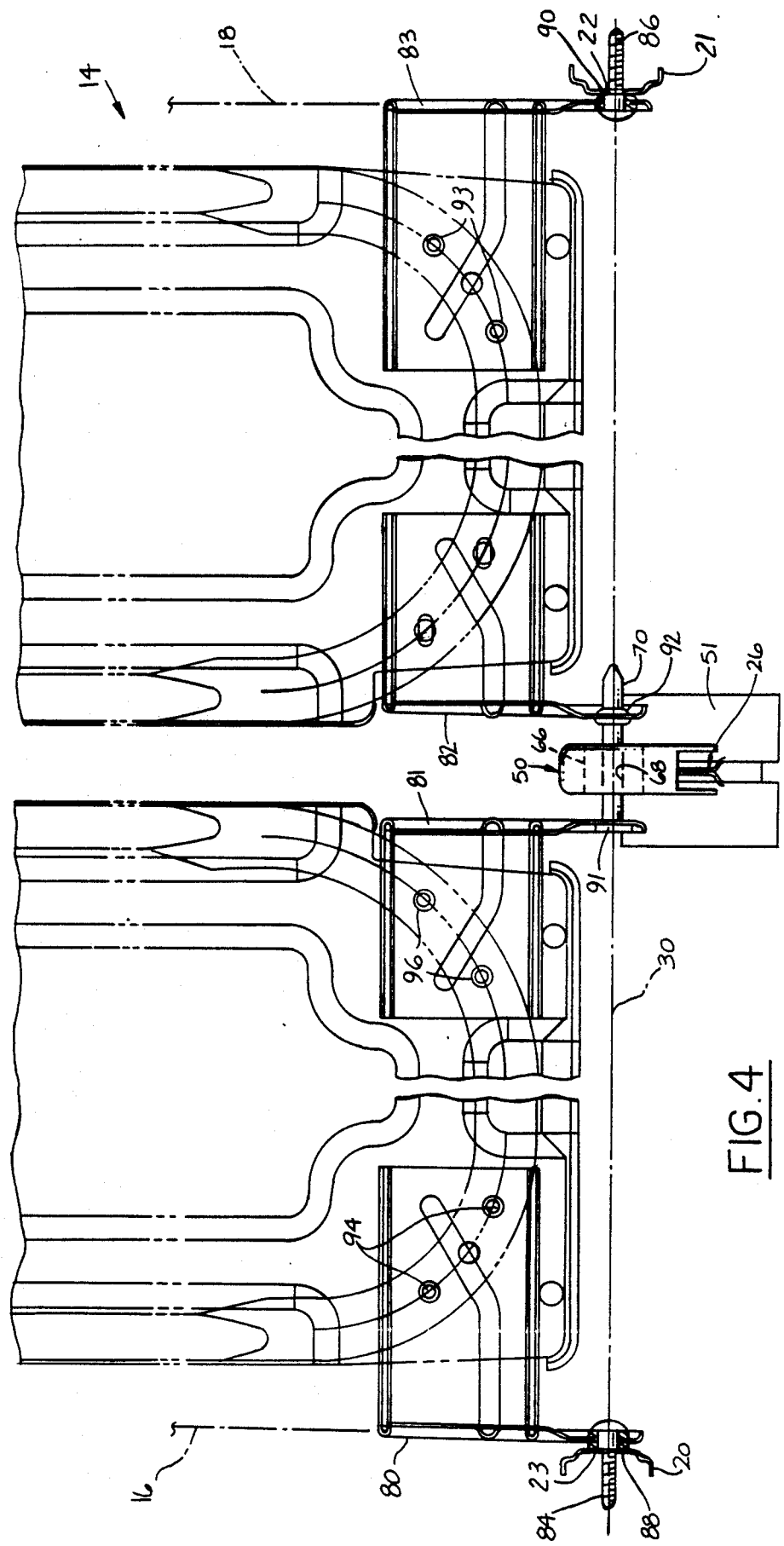
FIG. 4 is a fragmentary top elevational view of the seat backrests of FIG. 1 assembled with the composite center pivot bushing and cover of the present invention.

Referring now to the drawings and particularly to FIGS. 2, 3 and 4 of the present invention FIGS. 2 and 6 show a composite or unitary center pivot bushing and cover device, generally indicated at 50. The device is in the form of a one-piece molded synthetic resin or plastic housing adapted when assembled to define a chamber sized for concealing the center hinge bracket 26 shown upstanding from a support plate 51 fixed to the vehicle floor 12.

The cover device 50 is shown in FIG. 5 molded with an open-end lower end 50' disposed oppositely to an arcuately-shaped top wall portion 52 with its ends having tangent-like forward 53 and aft 54 planar end wall extensions. It will be noted in FIG. 3 that in the disclosed embodiment the hinge bracket 26 is canted forwardly from a sloped portion of the floor 12 while the aft end wall 54 is angled outwardly to conform with the shape of the hinge bracket. The hinge bracket 26 could, for example, be disposed vertically and the end walls 53 and 54 could be parallel without departing from the scope of the invention.

Figure 1:
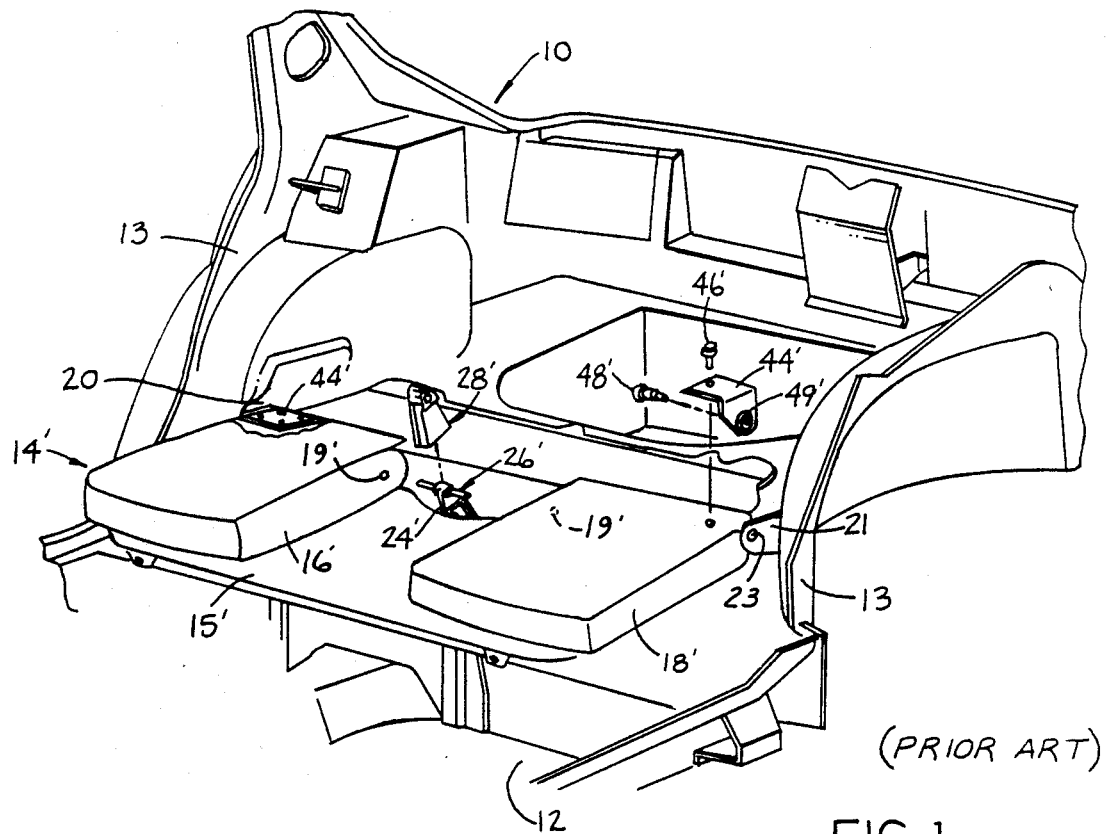
FIG. 1 is a partial perspective exploded view of a vehicle having a rear seat including a pair of forwardly folding seat backrests pivotally mounted thereon including a prior art pivot pin and center hinge bracket cover assembly.
Figure 1A:
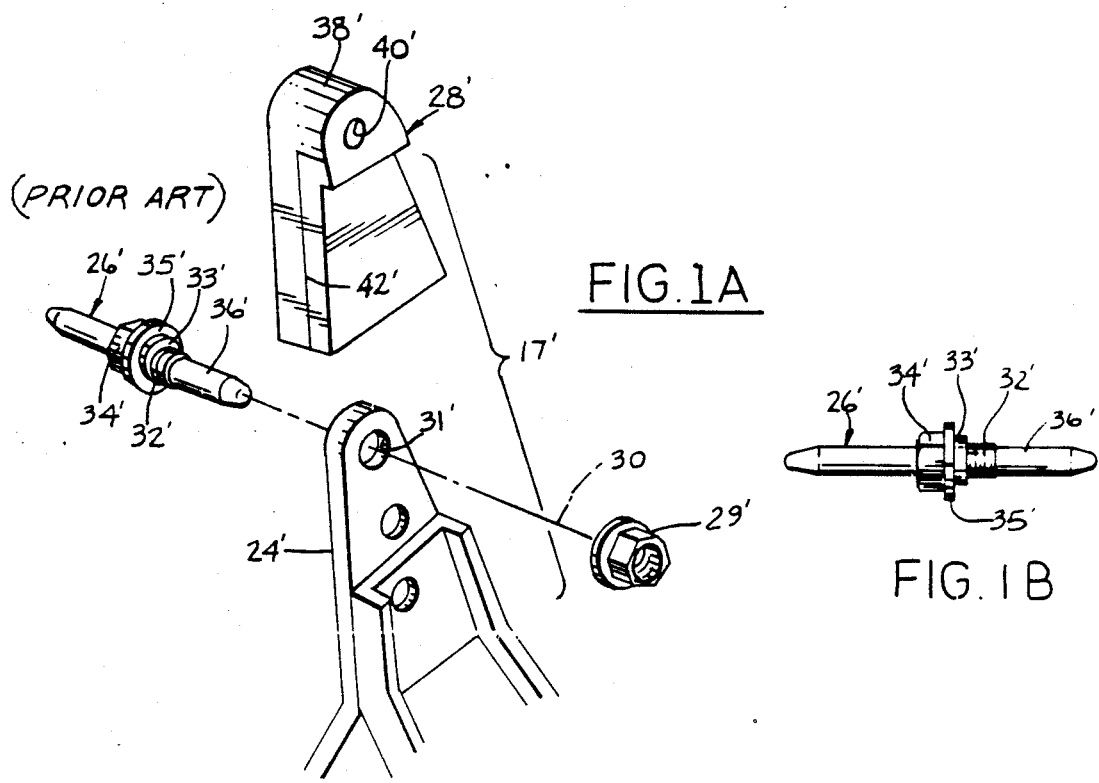
FIG. 1A is an enlarged fragmentary exploded perspective view of the prior art center hinge bracket, pivot pin, and cover assembly.
Figure 1B:
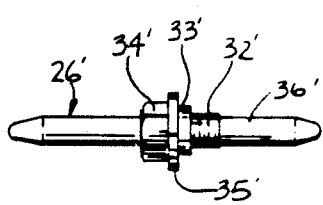
FIG. 1B is an enlarged detail view of the prior art pivot pin assembly.

A single side wall 56 is integrally connected to a peripheral edge of the top wall portion 52 together with its forward and aft end wall extensions 53 and 54. Also it will be noted that the forward end wall is notched-out at 55 to clear an angled portion of the hinge bracket 26. The side wall 56 is formed with a central circular aperture 57 with its center defining the center of curvature, denoted by radius "R" in FIG. 6, of the top wall portion 52. It will be appreciated upon viewing FIG. 6 that with the cover device mounted on the hinge bracket 26 the fixed side wall center of aperture 57 is aligned on the pivot axis 30 of the pair of side-by-side back rest 16 and 18 of FIG. 1.

The cover is provided with a pivotal side closure 62 oppositely disposed and in parallel relation to the matching fixed side wall 56. The side closure 62 is integrally connected to a peripheral side edge of the aft end wall extension 54 along its axis or rotation by an integral flexible web or "living hinge" 64 as viewed in FIGS. 2, 6, and 9. As best seen in FIGS. 2 and 7, a cylindrically-shaped tubular pivot bushing portion 66 is formed integrally with and perpendicularly projecting from the inner or inboard surface of the side closure 62. It will be noted in FIG. 7 that the bushing portion 66 is positioned, with an annular gap or clearance, within the fixed side wall central opening 57. The pivot bushing 66 is formed with an axially extending circular opening or passageway 68 sized for journally receiving therethrough a center pivot type hinge pin 70.

With reference to FIGS. 2 and 8 a latch keeper, in the form of a flexible rectangular U-shaped loop 71, is formed integral with and projects substantially perpendicularly from the inner surface of the side closure 62. A latch member 72, shown in FIG. 8, molded integral with the forward end wall extension 53, is operative to be engaged in a snap-action manner by the latch keeper 71 for releasably retaining the side closure 62 in its normal closed position of FIG. 5 parallel to the side wall 56.

As seen in FIG. 4 the seat back has outboard 80 and inboard 81 angled or L-shaped corner supports, fixedly attached thereto while the seat back 18 has inboard 82 and outboard 83 angled or L-shaped corner supports similarly fixedly attached thereto in a mirror image manner. Attachment screws 84 and 86 have journal shoulders adapted to be rotatably received in pivot bushings 88 and 90 respectively, of their associated corner brackets 80 and 83. The screws are adapted for threaded engagement in respective aperture 23 and 22 of their associated body wall mounts 20 and 21. The wall mount apertures 22 and 23 and the pivot bushings 88 and 90 are aligned on the transverse pivot axis 30. It will be noted in FIG. 4 that the center pivot hinge pin 70 has its head portion 91 fixed to the seat back inboard corner support 81 with its free end extending through an inboard pivot bushing 92 supported in seat back corner support 82.

The seat back 16 and 18 are assembled on the vehicle by first installing the detached outboard corner supports 80 and 83 separately with their respective screws 84 and 86. The screws 84 and 86 threadably engage the vehicle body upon being received in their associated wall mount apertures 22 and 23. Next, the cover device 50 is installed on the center hinge bracket 26 in a manner discussed above. The seat back 18, together with its previously attached inboard support 82, is next located in the vehicle compartment and the seat back 18 attached to its outboard corner support 83 by bolts 93. The seat back inboard support 81 is next positioned in the vehicle compartment with its center hinge pin 70 passed through the cover device center axially extending opening 68 and the pivot bushing 92 of the seat back inboard support 82. As a final step the seat back 16 is installed in the vehicle compartment by attaching bolts 94 to the outboard corner support 80 and bolts 96 to the inboard corner support 81.

Although the present invention has been shown and described with reference to a preferred embodiment thereof, and in terms of the illustrated drawings, it should not be considered as limited thereby. Thus, various possible modifications, omissions, and alternatives could be conceived by one skilled in the art without departing from the scope of the present invention, therefore, the scope of the invention should be defined solely by the scope of the appended claims which follow.

What is claimed is:

1. A composite cover and pivot bushing device for releasably enclosing a hinge bracket mounted on a vehicle body, said hinge bracket having a through bore which receives hinge pivot pin for rotation about a pivot axis, said composite device comprising:

a one piece molded synthetic resin housing having a top wall and an open lower end disposed oppositely thereto, a front end wall and an oppositely disposed aft. end . wall extending, downwardly from said top wall, a side wall and an oppositely disposed pivotal side closure extending downwardly from said top wall in spaced apart relation to one another, said walls and said side closure being correspondingly dimensioned and configured to define a chamber which encloses said hinge bracket;

said side wall integrally connected to a peripheral edge of said top wall disposed and structured for integral, interconnecting relation between said front and aft end walls, said side wall having a central circular opening with its center aligned on said pivot axis;

said pivotal side closure having a cylindrically-shaped tubular pivot bushing having an axial passageway, said pivot bushing extending through said hinge bracket bore and having a predetermined axial dimension such that its free end is positioned with an annular clearance within said side wall central opening;

said pivotal side closure being integrally joined to an adjacent one edge of said aft end wall along its axis of rotation by an integral flexible hinge web; and means for releasably locking said side closure in a closed position parallel to said side wall whereby said pivot bushing is captured in said hinge bracket bore with its axial passageway aligned on said pivot axis.

2. The composite cover and pivot bushing device as set forth in claim 1, wherein said top wall being arcuately shaped with its center of curvature on said pivot axis.

3. The composite cover and pivot bushing device as set forth in claim 1, wherein said locking means includes a latch keeper formed integral with the inner surface of said side closure, and a latch member integral with said front end wall said latch member engageable with said latch keeper in a snap-action manner.

4. A vehicle seat assembly comprising:

seat cushion means mounted on a vehicle body;

an upright hinge bracket mounted on the vehicle body having a through bore therein with its center aligned on a transverse pivot axis;

a pair of side-by-side first and second seat backs, each said seat back having a lower inboard support portion adapted to be mounted on pivot pin means supported in said hinge bracket through bore for pivotal movement about said pivot axis; each said seat back having a lower outboard support portion connected by outboard pivot means on said vehicle body for swinging movement of said seat backs about said pivot axis relative to said seat cushion means, the improvement wherein;

a composite pivot bushing and cover device in the form of a one-piece molded synthetic resin housing having an arcuately-shaped top wall and an open lower end disposed oppositely thereto, a front end wall and an oppositely disposed aft end wall extending downwardly from said top wall, a side wall and an oppositely disposed pivotable side closure extending downwardly from said top wall in spaced apart relation to one another, said walls and said side closure being correspondingly dimensioned and configured to define a chamber which encloses said hinge bracket, said top wall formed with its center of curvature substantially on said pivot axis;

said side wall integrally connected to a peripheral edge of said top wall disposed and structured for integral, interconnecting relation between said front and aft end walls, said side wall having a central circular opening with its center aligned on said pivot axis;

said pivotal side closure having a cylindrically-shaped tubular pivot bushing having an axial passageway, said pivot bushing formed integrally with and perpendicularly projecting from the inboard surface of said side closure, said pivot bushing extending through said hinge bracket bore and having a predetermined axial dimension such that its free end is positioned with an annular clearance within said side wall central opening;

said pivotal side closure being integrally joined to an adjacent one edge said aft end wall along its axis of rotation by an integral flexible web, a latch keeper integral with the inboard surface of said side closure, a latch member integral with said front end wall said latch member engagable with said latch keeper in a snap-action manner for releasably locking said side closure in its closed position parallel to said side wall whereby said pivot bushing is captured in said hinge bracket bore;

each said seat back having a support member fixed on its inboard pivot end, one said seat back provided with a central pivot pin journally received in and extending through said side closure pivot bushing axial passageway such that its free end extends through a journalled aperture in said other seat back support member enabling each said seat back to be folded about said pivot axis.

* * * * *